(12) United States Patent
Sato et al.

(10) Patent No.: US 7,029,797 B2
(45) Date of Patent: Apr. 18, 2006

(54) ELECTRODE PLATE FOR ALKALINE STORAGE BATTERY AND ALKALINE STORAGE BATTERY USING THE SAME

(75) Inventors: Naoto Sato, Kosai (JP); Nobuyasu Morishita, Toyohashi (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 64 days.

(21) Appl. No.: 10/150,788

(22) Filed: May 17, 2002

(65) Prior Publication Data

US 2003/0013020 A1    Jan. 16, 2003

(30) Foreign Application Priority Data

May 17, 2001    (JP)    ............................. 2001-148275

(51) Int. Cl.
*H01M 4/74* (2006.01)
(52) U.S. Cl. .................. 429/241; 429/242; 429/243
(58) Field of Classification Search ................ 429/241, 429/242, 243
See application file for complete search history.

(56) References Cited

U.S. PATENT DOCUMENTS

| | | | |
|---|---|---|---|
| 5,053,292 A | 10/1991 | Hasebe et al. | |
| 6,447,957 B1 * | 9/2002 | Sakamoto et al. | .......... 429/242 |
| 2002/0103470 A1 * | 8/2002 | Molander et al. | ...... 604/385.29 |

FOREIGN PATENT DOCUMENTS

| | | | |
|---|---|---|---|
| CN | 2153144 Y | | 1/1994 |
| CN | 2328101 Y | * | 7/1999 |
| EP | 0 632 513 A1 | | 1/1995 |
| EP | 0 651 451 A1 | | 5/1995 |
| EP | 0 884 793 A1 | | 12/1998 |
| EP | 0 926 752 A1 | | 6/1999 |
| EP | 0 940 866 A2 | | 9/1999 |
| EP | 1 219 364 A1 | | 7/2002 |
| JP | 6-181061 | * | 6/1994 |
| WO | WO 01/17710 A1 | | 3/2001 |

OTHER PUBLICATIONS

D. Linden, "Handbook of Batteries," 2nd Edition, McGraw-Hill, Inc. 1995.*
Copy of European Search Report dated Jun. 7, 2004.

* cited by examiner

Primary Examiner—Dah-Wei Yuan
(74) Attorney, Agent, or Firm—Snell & Wilmer L.L.P.

(57) ABSTRACT

An electrode plate for an alkaline storage battery of the present invention includes a conductive core material as a current collector, in which a plurality of through-holes are linearly provided in the core material so as to be parallel to a longitudinal direction of the core material, each through-hole having an aperture area of 10 $mm^2$ or less and at least two pairs of opposite sides parallel to each other.

9 Claims, 8 Drawing Sheets

PRIOR ART

FIG.8

ELECTRODE PLATE FOR ALKALINE STORAGE BATTERY AND ALKALINE STORAGE BATTERY USING THE SAME

BACKGROUND OF THE INVENTION

1. Field of the Invention

The present invention relates to an electrode plate for use in an alkaline storage battery and an alkaline storage battery using the same.

2. Description of the Related Art

Recently, as information apparatuses, such as cellular phones, PHS (Personal Handyphone System) phones, and notebook computers, are coming into wide use, a high value-added, compact and lightweight secondary battery having high energy density has been newly developed. Further, another secondary battery having high energy density has been newly developed as a power source of an electric car. Under such circumstances, there is need in the marketplace for batteries which are more compact and have higher capacity.

Particularly, in an alkaline storage battery, there is a problem of how to increase a filling density of conductive paste in a limited volume.

Figure 7:
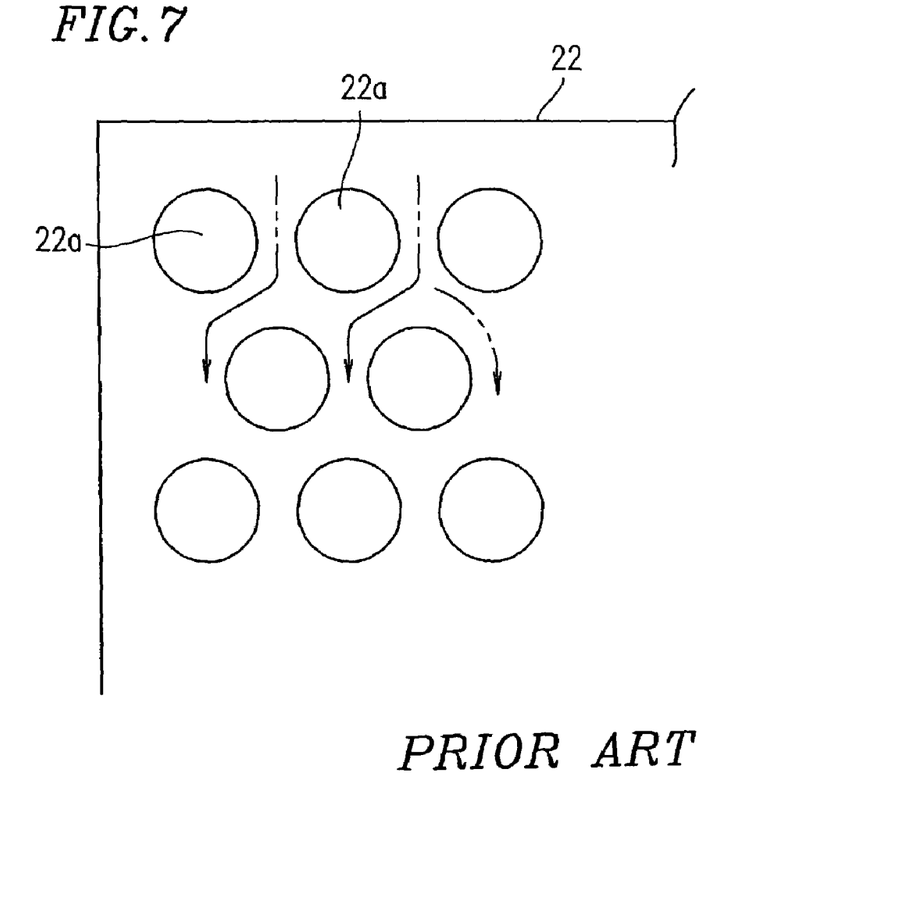
FIG. 7 is a developed view of a negative electrode plate used for a conventional alkaline storage battery.

In general, a negative electrode plate, which includes a core material coated with an active material, is used in an alkaline battery. As shown in FIG. 7, punching metal, which is a nickel-plated steel sheet including a plurality of round through-holes 22a filled with an active material, is used for the core material of the negative electrode plate. The through-holes 22a are arranged across a core material 22 along longitudinal and width directions thereof so as to form a staggered pattern. In the alkaline storage battery, the negative electrode plate using such a core material 22 and a positive electrode plate are laminated with a separator being sandwiched therebetween, and are spirally rolled. The rolled plates are concentrically placed in a cylindrical case. The cylindrical case is filled with an electrolyte of potassium hydroxide or the like.

In the case of a nickel-cadmium storage battery, the negative electrode plate includes a core material coated with conductive paste mainly containing cadmium. In the case of a nickel-metal hydride storage battery, the negative electrode plate includes a core material coated with conductive paste mainly containing a hydrogen absorbing alloy.

Generally, in order to increase a filling density of the conductive paste in the limited volume available, the negative electrode of the alkaline storage battery is pressed with high pressure after having been coated with the conductive paste or the proportion of the core material in the negative electrode plate is reduced by increasing an aperture ratio in the core material, i.e., a ratio of a total area of through-holes to an area of the core material.

However, excessive pressing increases warping in the electrode plate, deteriorating the processability. Further, an excessive increase in the aperture ratio in the core material reduces the strength of the electrode plate and core material portions through which electrons flow, causing an increase in electrical resistance.

SUMMARY OF THE INVENTION

According to one aspect of the present invention, there is provided an electrode plate for an alkaline storage battery including a conductive core material as a current collector, in which a plurality of through-holes are linearly provided in the core material so as to be parallel to a longitudinal direction of the core material, each through-hole having an aperture area of 10 mm$^2$ or less and at least two pairs of opposite sides parallel to each other.

In one embodiment of this invention, an aperture ratio in the core material is 10% to 50%.

In one embodiment of this invention, the core material is formed by a thin nickel-plated sheet containing steel as a main component or by a thin plate containing nickel as a main component.

According to another aspect of the present invention, there is provided an alkaline storage battery including positive and negative electrodes and an electrolyte, in which the electrode plate according to any one of claims 1 through 3 is used as an electrode plate for the positive or negative electrodes.

Thus, the invention described herein makes possible the advantages of providing: an electrode plate for an alkaline storage battery which can realize an increase in a filling density of the conductive paste, high strength of the electrode plate and suppression of an increase in electrical resistance by an increase in an aperture ratio in a core material of the electrode plate; and an alkaline storage battery using such an electrode plate.

These and other advantages of the present invention will become apparent to those skilled in the art upon reading and understanding the following detailed description with reference to the accompanying figures.

DESCRIPTION OF THE PREFERRED EMBODIMENTS

Hereinafter, embodiments of the present invention are described with reference to the drawings.

Figure 1:
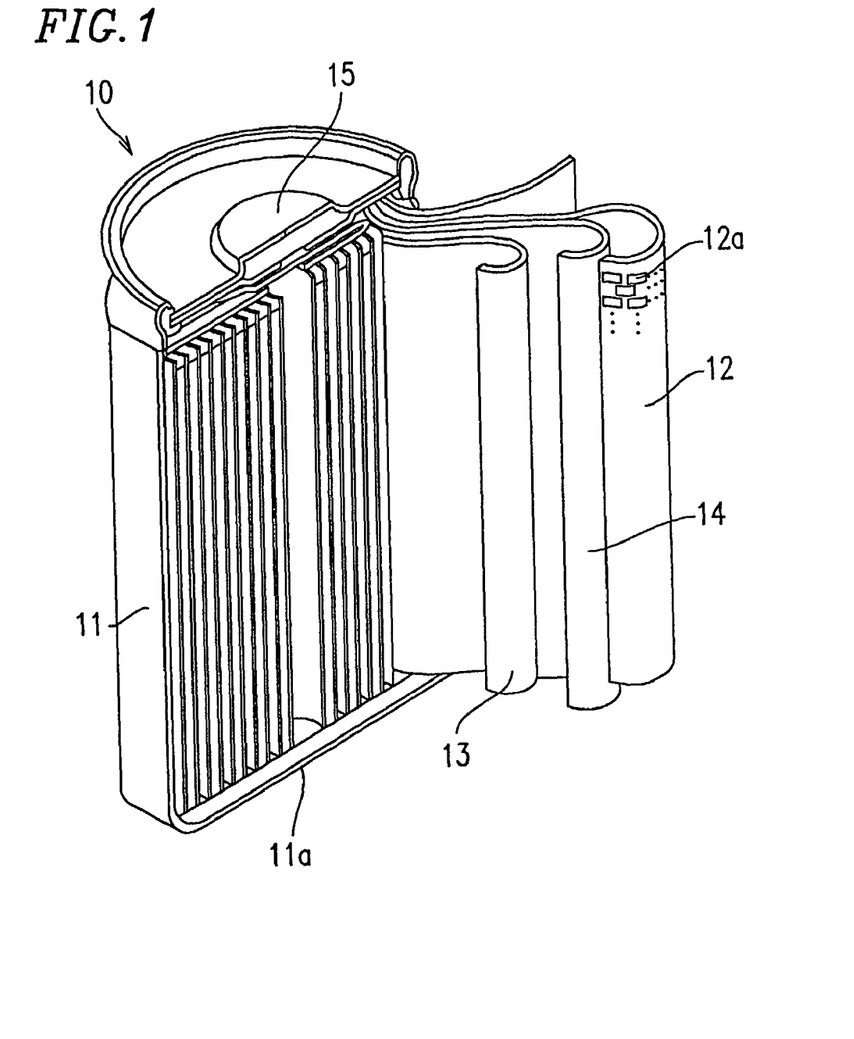
FIG. 1 is a perspective view showing a cutaway representation of a nickel-metal hydride storage battery using a negative electrode plate for an alkaline storage battery according to the present invention.

FIG. 1 is a perspective view showing a cutaway representation of an alkaline storage battery 10 using a negative electrode plate for an alkaline storage battery according to the present invention. The alkaline storage battery 10 is a nickel-metal hydride alkaline storage battery which uses a hydrogen absorbing alloy as a negative electrode component. In the alkaline storage battery 10, a negative electrode plate 12 having a rectangular shape and a positive electrode plate 13 having a similar rectangular shape are laminated with a separator 14 being sandwiched therebetween, and are spirally rolled along their longitudinal directions, and the rolled products are concentrically placed in a cylindrical case 11.

The case 11 is closed at one end 11a which is in contact with a side edge of the negative electrode plate 12 so as to function as a current collector for the negative electrode. The other end of the case 11 is open and sealed with a sealing plate 15. The sealing plate 15 is in contact with a side edge of the positive electrode plate 13 so as to function as a current collector for the positive electrode. The case 11 is filled with an alkaline aqueous solution mainly containing potassium hydroxide.

Figure 2:
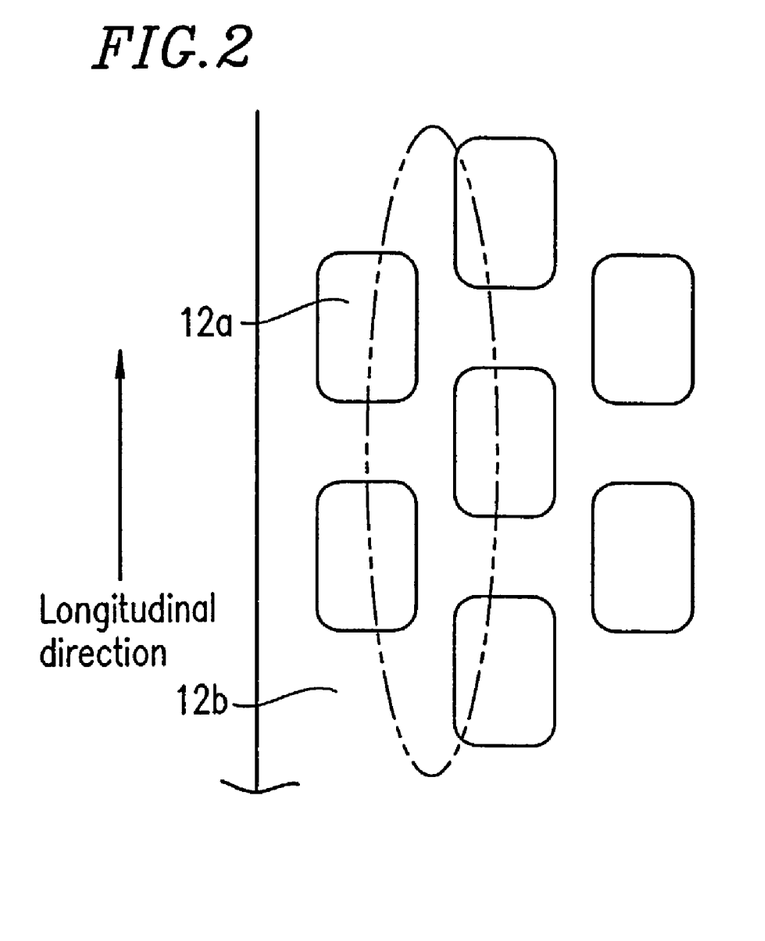
FIG. 2 is a developed view of a core material included in the negative electrode plate according to the present invention which is used for the nickel-metal hydride storage battery shown in FIG. 1.

The negative electrode plate 12 includes a thin nickel-plated steel sheet as a core material. FIG. 2 is a developed view of a core material 12b used for the negative electrode plate 12. The core material 12b has a rectangular shape and is provided with a plurality of square or rectangular through-holes 12a and is coated with conductive paste mainly containing a hydrogen absorbing alloy.

The through-holes 12a provided in the core material 12b are linearly arranged at regular intervals so as to be parallel to the longitudinal direction of the core material 12b. Adjacent two rows of through-holes 12a along the longitudinal direction of the core material 12b are suitably spaced from each other so as to form a staggered pattern.

As described in more detail below, in order to prevent the conductive paste coating the core material 12b from being removed undesirably, each through-hole 12a is formed so as to be a rectangle having an aperture area of 10 mm$^2$ or less and an aperture ratio in the core material 12b is about 10% to 50%, i.e., a ratio of a total area of the through-holes 12a to an entire area of the core material 12b is 1:9 to 5:5. The shape of each through-hole 12a is not limited to a rectangle as long as it is a polygon having at least two pairs of opposite sides parallel to each other. Alternatively, the shape of each through-hole 12a can be a polygon having R-cut (radius cut) corners or cut-processed corners.

The positive electrode 13 includes a thin plate of foam nickel which is also used as a positive electrode plate for an ordinary nickel-hydrogen alkaline storage battery. The separator 14 is formed by a sulfonated polypropylene nonwoven fabric which is also used as a separator for an ordinary nickel-hydrogen alkaline storage battery.

Since the through-holes 12a provided in the core material 12b have rectangular shapes and are linearly arranged along the longitudinal direction of the core material 12b, core material portions (see the area indicated by a two-dot chain line in FIG. 2) exist between rows of the through-holes 12a arranged along the longitudinal direction of the core material 12b so as to be continuous along the longitudinal direction of the core material 12b. In comparison to a case where the round through-holes as shown in FIG. 7 are provided, the core material 12b having this structure has improved tensile strength in the longitudinal direction thereof. Consequently, when pressing the core material 12b so as to form the through-holes 12a, stress on the core material 12b to which maximum press stress is applied along the longitudinal direction of the core material 12b can be almost uniform in the longitudinal direction of the core material 12b, whereby elongation (warping) of the core material 12b along the longitudinal direction thereof can be suppressed.

When an aperture area of each through-hole 12a provided in the core material 12b of the negative electrode plate 12 is increased, the conductive paste coating the core material 12b might be removed. Therefore, each through-holes 12a is provided so as to have the aperture area of 10 mm$^2$ or less. This allows the negative electrode plate 12 to be kept at prescribed strength even if a filling density of the conductive paste is increased.

Further, when the aperture ratio in the core material 12b is increased, a proportion of the portions of the core material 12b in the negative electrode plate 12 is relatively reduced, and thus electrical resistivity of the negative electrode plate 12 itself might be increased. On the other hand, when the aperture ratio in the core material 12b is reduced, the conductive paste coating the core material 12b might be removed. Therefore, the aperture rate in the core material 12b is made to be about 10% to 50%. This increases the filling density of the conductive paste while the negative electrode plate 12 can be kept at high strength and an increase in electrical resistance of the negative electrode plate can be suppressed.

In the above embodiment, although the nickel-metal hydride storage battery has been described as the alkaline storage battery, the negative electrode plate according to the present invention can be applied to a nickel-cadmium storage battery. In such a case, cadmium is used as an active material, i.e., the core material of the negative electrode plate is coated with conductive paste mainly containing cadmium.

Further, in the above embodiment, although the cylindrical battery in which spirally rolled electrode plates are placed in a case has been described, similar effects can be achieved for a square battery in which laminated electrode plates are placed in a rectangular case.

Furthermore, the present invention can be applied to the so-called sinter-type positive electrode plate, which is formed by coating the core material according to the above embodiment with conductive paste mainly containing nickel powder, sintering the core, and then impregnating the core with a nickel hydroxide active material.

The electrode plate can be a thin plate containing nickel as a main component.

Hereinafter, examples of the alkaline storage battery which were produced according to the present invention are described.

EXAMPLE 1

Figure 3:
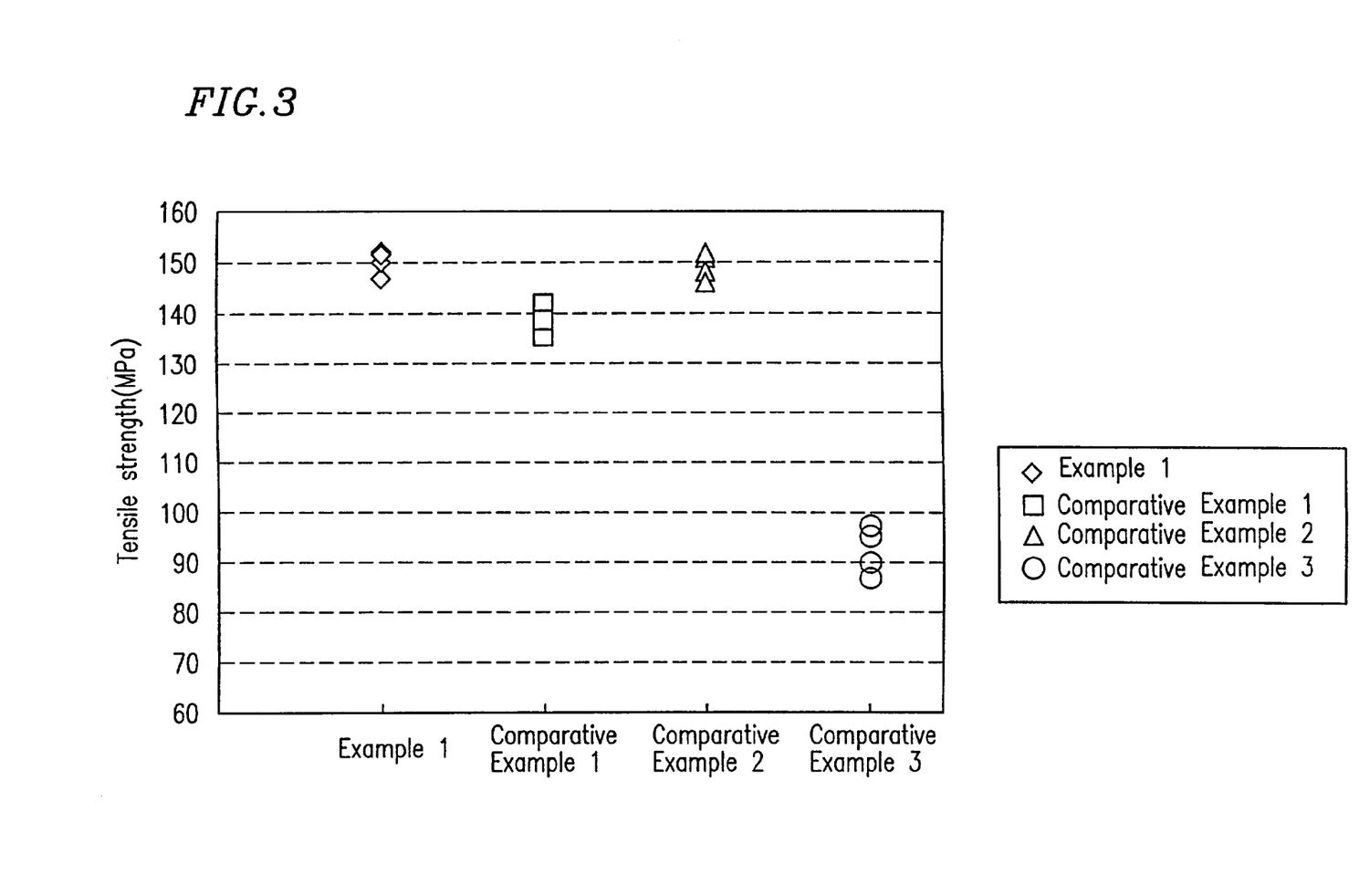
FIG. 3 is a graph showing the tensile strength of core materials used for the negative electrode plates according to the present invention.

In Example 1, a thin nickel-plated steel sheet was used as a core material of a negative electrode plate. As shown in FIG. 2, rectangular through-holes each having an aperture area of 2 mm$^2$ (1 mm×2 mm) were linearly provided at regular intervals along the longitudinal direction of the core materials such that an aperture ratio in the core material electrode plate was 40%. When the tensile strength along the longitudinal direction of the core material was measured, it was about 147 to 153 MPa. The measurement results are shown in FIG. 3.

The core material having a plurality of through-holes as described above was coated with a conductive paste of a hydrogen absorbing alloy. The alloy composition of the hydrogen absorbing alloy was $MmNi_{3.5}Co_{0.75}Al_{0.3}Mn_{0.4}$. The hydrogen absorbing alloy was crushed by a ball mill such that an average particle size thereof was about 20 μm. The core material was coated with resultant alloy powder (theoretical capacity 10 Ah) together with a binding agent and was dried. Thereafter, by rolling the core material, the negative electrode plate was produced so as to have a thickness of 0.30 mm.

As shown in FIG. 1, the produced negative electrode plate was spirally rolled along the longitudinal direction thereof together with a positive electrode plate formed by foam nickel and a separator formed by a sulfonated polypropylene nonwoven fabric which was sandwiched between the negative and positive electrode plates. The rolled plates were placed in a case. The case was filled with an alkaline aqueous solution, as an electrolyte, which mainly contained potassium hydroxide having a specific gravity of 1.3. By sealing an open end of the case with a sealing plate, a nickel-metal hydride storage battery of size D was produced as an alkaline storage battery. The capacity of the produced nickel-metal hydride storage battery was about 6.5 Ah.

Variances in internal resistance of the produced nickel-metal hydride storage battery were measured while repeating charge and discharge of the nickel-metal hydride storage battery. In cycle testing by repeating charge and discharge of the battery, one cycle includes charging the battery at 13 A (2C) for thirty minutes and discharging the battery at 13 A until the battery voltage becomes 1 V.

The internal resistance of the battery was measured in the following manner. After a 50% charge was given to the produced battery having the theoretical capacity of 6.5 Ah, the battery was left for three hours in an environmental temperature of 25° C. Thereafter, as shown in Table 1 below, a ten-second discharge at a prescribed current value and a ten-second charge at the same current value were repeatedly conducted with a sixty-second pause therebetween so as to measure battery voltages after the discharge and charge. The current values for the discharge and charge were sequentially changed from 10 A, 25 A, 40 A, 60 A to 80 A. A discharge at 100 A was conducted at the end. A graph was plotted such that the horizontal axis denotes current values after the discharge and charge and the vertical axis denotes measured battery voltage values. A gradient calculated from the graph is considered to indicate the internal resistance of the battery according to Ohm's law, and thus the internal resistance of the battery was calculated using a method of least squares.

TABLE 1

| State | Current Values (A) | time (seconds) |
|---|---|---|
| Discharge | 10 | 10 |
| Pause | — | 60 |
| Charge | 10 | 10 |
| Pause | — | 60 |
| Discharge | 25 | 10 |
| Pause | — | 60 |
| Charge | 25 | 10 |
| Pause | — | 60 |
| Discharge | 40 | 10 |
| Pause | — | 60 |
| Charge | 40 | 10 |
| Pause | — | 60 |
| Discharge | 60 | 10 |
| Pause | — | 60 |
| Charge | 60 | 10 |
| Pause | — | 60 |
| Discharge | 80 | 10 |
| Pause | — | 60 |
| Charge | 80 | 10 |
| Pause | — | 60 |

TABLE 1-continued

| State | Current Values (A) | time (seconds) |
|---|---|---|
| Discharge | 100 | 10 |
| Pause | — | 60 |

Figure 4:
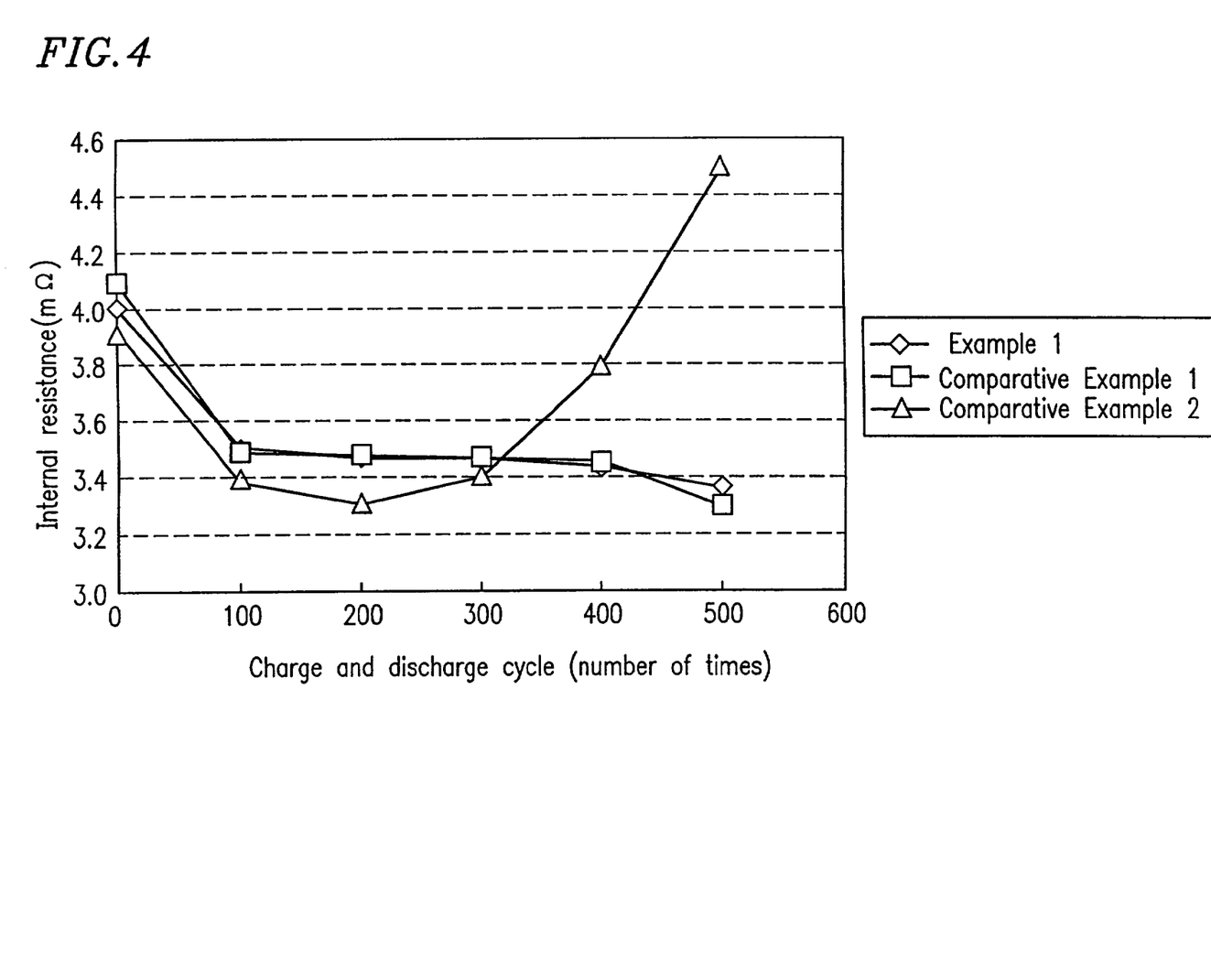
FIG. 4 is a graph showing a relationship between charge and discharge cycles and internal resistance with respect to the nickel-metal hydride storage batteries using the negative electrode plates according to the present invention.

The measurement results are shown in FIG. 4. As shown in FIG. 4, the nickel-metal hydride storage battery of Example 1 initially had an internal resistance of about 4.0 mΩ after its production. By repeating charge and discharge cycles a hundred times, the internal resistance of the nickel-metal hydride storage battery was reduced to about 3.5 mΩ. Thereafter, the internal resistance of the nickel-metal hydride storage battery hardly varied.

EXAMPLE 2

Figure 5:
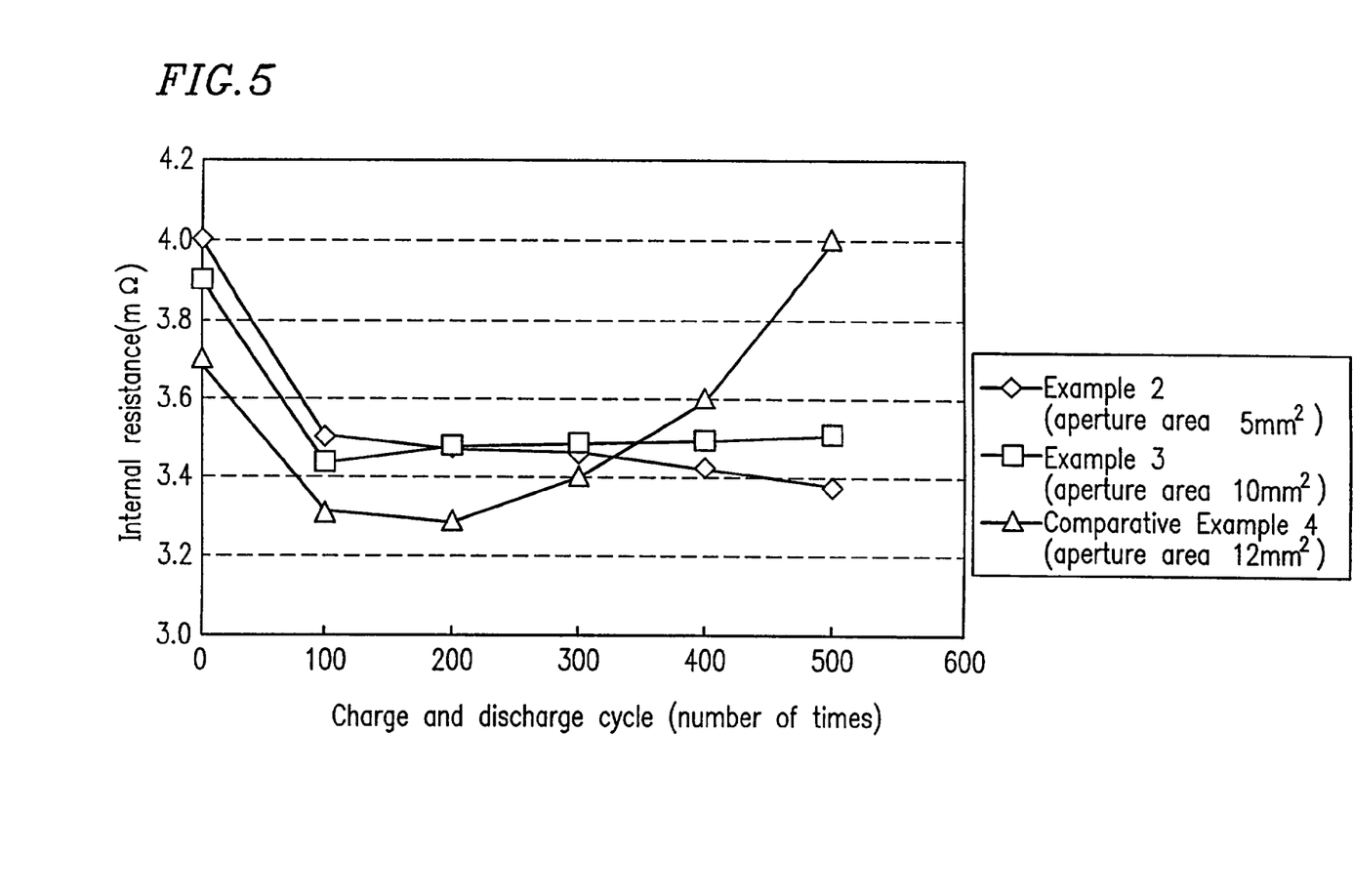
FIG. 5 is another graph showing a relationship between charge and discharge cycles and internal resistance with respect to the nickel-metal hydride storage batteries using the negative electrode plates according to the present invention.

In Example 2, a negative electrode plate was formed in a similar manner to Example 1 except that rectangular through-holes each having an aperture area of 5 mm² (1 mm×5 mm) were formed such that an aperture ratio in a core material of the negative electrode plate was 40%. Similar to Example 1, a nickel-metal hydride storage battery was produced using the negative electrode plate. FIG. 5 shows measurement results of a relationship between charge and discharge cycles and internal resistance with respect to the nickel-metal hydride storage battery of Example 2. The nickel-metal hydride storage battery of Example 2 initially had an internal resistance of about 4.0 mΩ after its production. By repeating charge and discharge cycles a hundred times, the internal resistance of the nickel-metal hydride storage battery was reduced to about 3.5 mΩ. Thereafter, the internal resistance of the nickel-metal hydride storage battery hardly varied.

EXAMPLE 3

In Example 3, a negative electrode plate was formed in a similar manner to Example 1 except that rectangular through-holes each having an aperture area of 10 mm² (2 mm×5 mm) were formed such that an aperture ratio in a core material of the negative electrode plate was 40%. Similar to Example 1, a nickel-metal hydride storage battery was produced using the negative electrode plate. FIG. 5 also shows measurement results of a relationship between charge and discharge cycles and internal resistance of the nickel-metal hydride storage battery of Example 3. The nickel-metal hydride storage battery of Example 3 initially had an internal resistance of about 3.9 mΩ after its production. By repeating charge and discharge cycles a hundred times, the internal resistance of the nickel-metal hydride storage battery was reduced to about 3.4 mΩ. Thereafter, the internal resistance of the nickel-metal hydride storage battery hardly varied.

COMPARATIVE EXAMPLE 1

In Comparative Example 1, a core material was formed in a similar manner to Example 1 except that, as shown in FIG. 7, round through-holes each having an aperture area of 2 mm²(a diameter: 1.6 mm) were formed such that an aperture ratio in the core material was 40%. The tensile strength along the longitudinal direction of the core material was measured. The measurement results are shown in FIG. 3. The tensile strength of the core material of Comparative Example 1 was about 136 to 142 MPa, which is lower than that of the core material of Example 1.

Further, similar to Example 1, a negative electrode plate was produced using the core material, and a nickel-metal hydride storage battery was produced using the negative electrode plate. A relationship between charge and discharge cycles and internal resistance with respect to the nickel-metal hydride storage battery of Comparative Example 1 was measured. The measurement results are shown in FIG. 4. The nickel-metal hydride storage battery of Comparative Example 1 initially had an internal resistance of about 4.1 mΩ after its production. The internal resistance of the nickel-metal hydride storage battery of Comparative Example 1 is greater than that of the nickel-metal hydride storage battery of Example 1. However, by repeating charge and discharge cycles a hundred times, the internal resistance of the nickel-metal hydride storage battery of Comparative Example 1 was reduced to about 3.4 mΩ. Thereafter, the internal resistance of the nickel-metal hydride storage battery hardly varied. The measurement results in Comparative Example 1 are almost similar to those in Example 1.

COMPARATIVE EXAMPLE 2

In Comparative Example 2, a core material was formed in a similar manner to Example 1 except that, as shown in FIG. 7, round through-holes each having an aperture area of 2 mm$^2$ (a diameter: 1.6 mm) were formed such that an aperture ratio in the core material was 30%. The tensile strength along the longitudinal direction of the core material was measured. The measurement results are shown in FIG. 3. The tensile strength of the core material of Comparative Example 2 was about 146 to 152 MPa, which is almost equal to that of the core material of Example 1.

Further, similar to Example 1, a negative electrode plate was produced using the core material, and a nickel-metal hydride storage battery was produced using the negative electrode plate. A relationship between charge and discharge cycles and internal resistance with respect to the nickel-metal hydride storage battery of Comparative Example 2 was measured. The measurement results are shown in FIG. 4. In nickel-metal hydride storage battery of Comparative Example 2, the aperture ratio was as low as 30%, and thus the internal resistance of the nickel-metal hydride storage battery of Comparative Example 2 was low from immediately after its production to a three hundredth charge and discharge cycle. However, after the three hundredth charge and discharge cycle, the internal resistance of the nickel-metal hydride storage battery of Comparative Example 2 was greatly increased since the conductive paste containing a hydrogen absorbing alloy was peeled off the core material.

COMPARATIVE EXAMPLE 3

Figure 8:
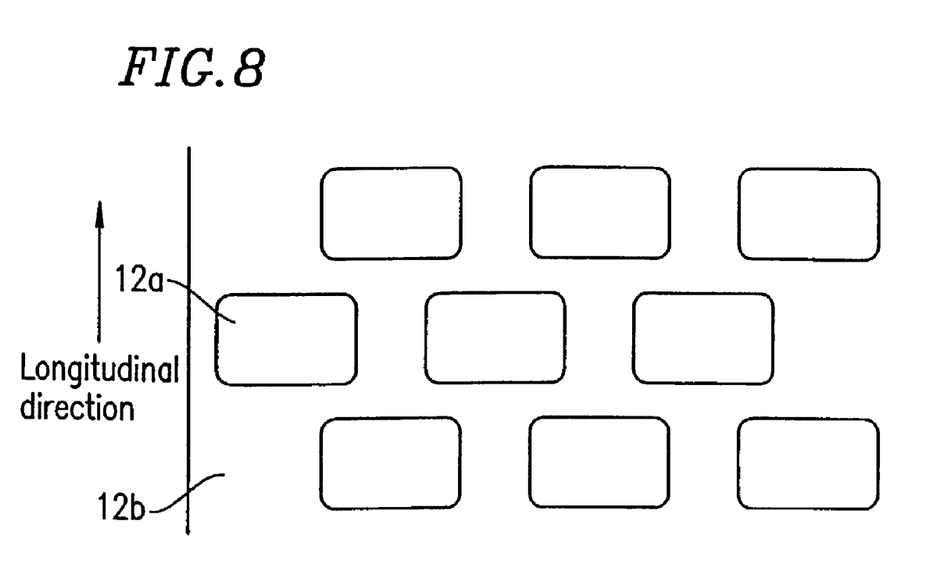
FIG. 8 is a developed view of a core material included in a negative electrode plate according to a comparative example of the present invention.

In Comparative Example 3, a core material was formed such that rectangular through-holes each having an aperture area of 2 mm$^2$ (1 mm×2 mm) were formed and an aperture ratio in the core material was 40%. As shown in FIG. 8, the through-holes were arranged across the core material along the longitudinal and width directions thereof so as to form a staggered pattern unlike that of FIG. 2. When the tensile strength along the longitudinal direction of the core material was measured, it was as low as about 87 to 98 MPa. The measurement results are shown in FIG. 3.

COMPARATIVE EXAMPLE 4

In Comparative Example 4, a negative electrode plate was formed in a similar manner to Example 1 except that rectangular through-holes each having an aperture area of 12 mm$^2$ (3 mm×4 mm) were formed such that an aperture ratio in a core material of the negative electrode plate was 40%. Similar to Example 1, a nickel-metal hydride storage battery was produced using the negative electrode plate of Comparative Example 4. A relationship between charge and discharge cycles and internal resistance with respect to the nickel-metal hydride storage battery of Comparative Example 4 was measured. The measurement results are shown in FIG. 5. In nickel-metal hydride storage battery of Comparative Example 4, the aperture area was as large as 12 mm$^2$ (3 mm×4 mm), and thus the internal resistance of the nickel-metal hydride storage battery of Comparative Example 4 was as low as 3.7 mΩ from immediately after its production to a three hundredth charge and discharge cycle. However, after the three hundredth charge and discharge cycle, the internal resistance of the nickel-metal hydride storage battery of Comparative Example 4 was greatly increased since the conductive paste containing a hydrogen absorbing alloy was peeled off the core material.

COMPARATIVE EXAMPLE 5

Figure 6:
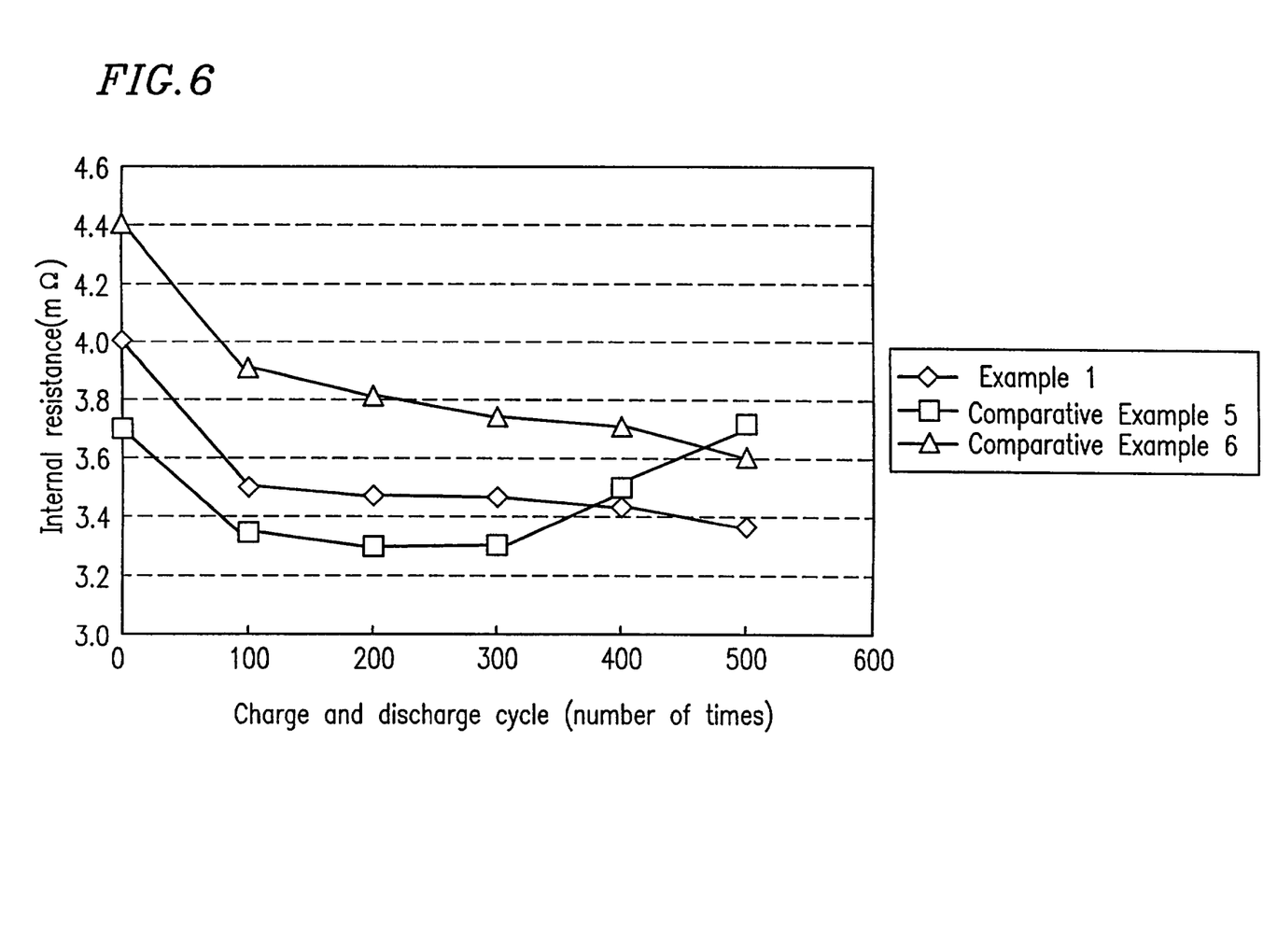
FIG. 6 is a graph showing a relationship between charge and discharge cycles and internal resistance with respect to nickel-metal hydride storage batteries using negative electrode plates according to comparative examples of the present invention.

In Comparative Example 5, a negative electrode plate was formed in a similar manner to Example 1 except that rectangular through-holes each having an aperture area of 2 mm$^2$ (1 mm×2 mm) were formed such that an aperture ratio in a core material of the negative electrode plate was 7%. Similar to Example 1, a nickel-metal hydride storage battery was produced using the negative electrode plate of Comparative Example 5. A relationship between charge and discharge cycles and internal resistance with respect to the nickel-metal hydride storage battery of Comparative Example 4 was measured. The measurement results in Comparative Example 5 are shown in FIG. 6 together with those in Example 1. In nickel-metal hydride storage battery of Comparative Example 5, the aperture ratio was low, and thus the initial internal resistance of the nickel-metal hydride storage battery of Comparative Example 5 was also low. However, after the three hundredth charge and discharge cycle, the internal resistance of the nickel-metal hydride storage battery of Comparative Example 5 was greatly increased since the conductive paste containing a hydrogen absorbing alloy was peeled off the core material.

COMPARATIVE EXAMPLE 6

In Comparative Example 6, a negative electrode plate was formed in a similar manner to Example 1 except that rectangular through-holes each having an aperture area of 2 mm$^2$ (1 mm×2 mm) were formed such that an aperture ratio in a core material of the negative electrode plate was 60%. Similar to Example 1, a nickel-metal hydride storage battery was produced using the negative electrode plate of Comparative Example 6. A relationship between charge and discharge cycles and internal resistance with respect to the nickel-metal hydride storage battery of Comparative Example 6 was measured. The measurement results in Comparative Example 6 are also shown in FIG. 6. In nickel-metal hydride storage battery of Comparative Example 6, the aperture ratio was high, and thus the initial internal resistance of the nickel-metal hydride storage battery of Comparative Example 6 was also high. Even after the three hundredth charge and discharge cycle, the internal resistance of the nickel-metal hydride storage battery of Comparative Example 6 was increased.

As described above, in the negative electrode plate for an alkaline storage battery according to the present invention, a plurality of through-holes each having a prescribed shape are linearly provided parallel to and along the longitudinal direction of a core material. Therefore, current flows through core material portions having a constant width between adjacent two rows of through-holes, whereby an increase in internal electrical resistance of the alkaline storage battery can be suppressed. Further, since an aperture area of each through-hole is 10 mm$^2$ or less, conductive paste of an active material coating the core material can be prevented from being removed from (peeled off) the core material. Furthermore, even if a filling density of the conductive paste is increased, the internal resistance of the alkaline storage battery can be stabilized for a long time.

Further still, by providing an aperture ratio of 10% to 50%, the strength of the core material itself can be prevented from being reduced.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An electrode plate for an alkaline storage battery comprising a conductive core material as a current collector, wherein a plurality of through-holes with radius cut corners are linearly provided in the core material so as to be parallel to a longitudinal direction of the core material,
   wherein
   the through-holes are rectangular in shape with a longer side parallel to the longitudinal direction of the core material,
   rows of through-holes are provided along the longitudinal direction adjacent to one-another in a transverse direction of the core material,
   a space between the through-holes in the longitudinal direction is larger than a space between the adjacent through-holes in the transverse direction,
   the through-holes adjacent to one-another in the transverse direction of the core material are staggered with respect to one another in the longitudinal direction of the core material, and
   each through-hole having an aperture area of 10 mm$^2$ or less and two pairs of opposite sides parallel to each other.

2. An electrode plate for an alkaline storage battery according to claim 1, wherein an aperture ratio in the core material is 10% to 50%.

3. An electrode plate for an alkaline storage battery according to claim 1, wherein the core material is formed by a thin nickel-plated sheet containing steel as a main component or by a thin plate containing nickel as a main component.

4. An alkaline storage battery comprising positive and negative electrodes and an electrolyte, wherein the electrode plate according to claim 1 is used as an electrode plate for the positive or negative electrodes.

5. An alkaline storage battery comprising positive and negative electrodes and an electrolyte, wherein the electrode plate according to claim 2 is used as an electrode plate for the positive or negative electrodes.

6. An alkaline storage battery comprising positive and negative electrodes and an electrolyte, wherein the electrode plate according to claim 3 is used as an electrode plate for the positive or negative electrodes.

7. An electrode plate for an alkaline storage battery according to claim 1, wherein the core material has a tensile strength in the longitudinal direction greater then 147 MPa.

8. A method for producing electrode plates for an alkaline storage battery, including the steps of:
   pressing a plurality of through-holes with radius cut corners in the core material of the electrode plate, wherein
   the through-holes are linearly provided in the core material so as to be parallel to a longitudinal direction of the core material, and
   wherein
   the through-holes are rectangular in shape with a longer side parallel to the longitudinal direction of the core material,
   rows of through-holes are provided along the longitudinal direction adjacent to one-another in a transverse direction of the core material,
   space through between in the longitudinal direction is larger than a space between the adjacent through holes in the transverse direction,
   the through-holes adjacent to one-another in the transverse direction of the core material are staggered with respect to one another in the longitudinal direction of the core material, and
   each through-hole having an aperture area of 10 mm$^2$ or less and two pairs of opposite sides parallel to each other.

9. The method of claim 8, wherein said one of the two pairs of opposite sides and said another of the two pairs of opposite sides form a right angle at their intersection.

* * * * *